(12) United States Patent
He et al.

(10) Patent No.: US 11,901,668 B2
(45) Date of Patent: Feb. 13, 2024

(54) MODULAR DEVICE, CONTROL METHOD AND ROBOT

(71) Applicant: UBTECH ROBOTICS CORP LTD, Shenzhen (CN)

(72) Inventors: Wei He, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 885 days.

(21) Appl. No.: 16/926,634

(22) Filed: Jul. 10, 2020

(65) Prior Publication Data

US 2021/0203100 A1 Jul. 1, 2021

(30) Foreign Application Priority Data

Dec. 28, 2019 (CN) .......................... 201911384817.2

(51) Int. Cl.
| | |
|---|---|
| *H01R 13/62* | (2006.01) |
| *B25J 9/08* | (2006.01) |
| *B25J 13/08* | (2006.01) |
| *B25J 19/00* | (2006.01) |
| *H01R 13/66* | (2006.01) |

(52) U.S. Cl.
CPC ............ *H01R 13/6205* (2013.01); *B25J 9/08* (2013.01); *B25J 13/087* (2013.01); *B25J 19/0025* (2013.01); *H01R 13/6683* (2013.01)

(58) Field of Classification Search
CPC ............ H01R 13/6205; H01R 13/6683; H01R 27/02; H01R 31/065; H01R 13/665; H01R 27/00; B25J 9/08; B25J 13/087; B25J 19/0025; B25J 19/0033
See application file for complete search history.

(56) References Cited

U.S. PATENT DOCUMENTS

| | | | | |
|---|---|---|---|---|
| 3,838,315 | A * | 9/1974 | Wilbourn ................. | H02B 1/24 439/55 |
| 8,998,636 | B2 * | 4/2015 | Gomez ................. | H01R 13/665 439/505 |
| 10,074,949 | B1 * | 9/2018 | Chang ................. | H01R 13/7039 |
| 2015/0127146 | A1 * | 5/2015 | Carlson ................. | B25J 9/1617 700/245 |
| 2015/0251104 | A1 * | 9/2015 | Lange ................. | A63H 33/046 446/92 |
| 2016/0229067 | A1 * | 8/2016 | Nishimura ............. | B25J 13/085 |

(Continued)

FOREIGN PATENT DOCUMENTS

| | | |
|---|---|---|
| CN | 209548710 U | 10/2019 |
| CN | 110587590 A | 12/2019 |

*Primary Examiner* — Abdullah A Riyami
*Assistant Examiner* — Nelson R. Burgos-Guntin

(57) ABSTRACT

A modular device includes a polyhedral building element having a first type connector and a number of second type connectors; and a main control module comprising a plurality of second type connectors. The first type connector and the second type connectors are disposed on side surfaces of the building element. One of the second type connectors of the main control module is used to magnetically connect with the first type connector of the building element so as to detachably connect the building element to the main control module. The first type connector includes a first detection circuit, and each second type connector includes a second detection circuit.

11 Claims, 8 Drawing Sheets

(56) References Cited

U.S. PATENT DOCUMENTS

| | | | |
|---|---|---|---|
| 2017/0220512 A1* | 8/2017 | Lin | G06F 1/3287 |
| 2017/0220515 A1* | 8/2017 | Lin | G06F 13/4022 |
| 2017/0252664 A1* | 9/2017 | Cletheroe | A63H 33/046 |
| 2018/0086453 A1* | 3/2018 | Scott-Nash | G08G 5/0021 |
| 2018/0217013 A1* | 8/2018 | Kawai | G01L 5/0061 |
| 2018/0283965 A1* | 10/2018 | Matsuzawa | G01L 5/167 |
| 2018/0283966 A1* | 10/2018 | Matsuzawa | G01L 5/0061 |
| 2019/0001510 A1* | 1/2019 | Nagamatsu | G01L 5/0061 |
| 2020/0188807 A1* | 6/2020 | Xiong | A63H 33/042 |
| 2020/0206646 A1* | 7/2020 | Zeng | A63H 33/08 |
| 2021/0197372 A1* | 7/2021 | He | G06F 13/4068 |
| 2021/0203100 A1* | 7/2021 | He | B25J 9/08 |

* cited by examiner

MODULAR DEVICE, CONTROL METHOD AND ROBOT

CROSS REFERENCE TO RELATED APPLICATIONS

This application claims priority to Chinese Patent Application No. 201911384817.2, filed Dec. 28, 2019, which is hereby incorporated by reference herein as if set forth in its entirety.

BACKGROUND

1. Technical Field

The present disclosure generally relates to modular devices, and particularly to a modular device and a robot having the same.

2. Description of Related Art

Modular devices (e.g. modular robots) are usually composed of multiple building blocks of a relatively small repertoire, with uniform docking interfaces that allow transfer of mechanical forces and moments, electrical power and communication throughout the modular devices. Modular devices are designed with parts that can be reconfigured to assume different shapes and functions. Self-reconfiguring devices have the ability to adapt to the operating environment and the required functionality by changing shape. It is thus useful and desirable to provide a new modular device that facilitates improvement of construction efficiency of the modular device, and a robot including the modular device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
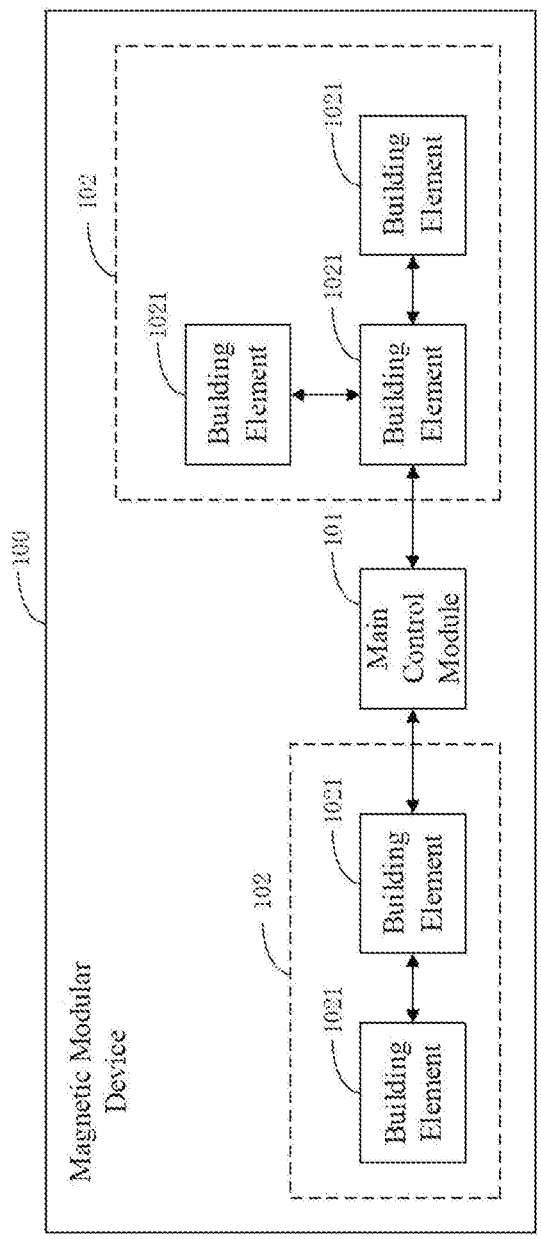
FIG. 1 is a schematic block diagram of a modular device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIG. 1, in one embodiment, a modular device 100 includes a main control module 101 and at least one connection module 102 that includes at least one building element 1021.

In one embodiment, the modular device 100 can be used to create a modular robot. The number of the connection modules 102 and the building elements 1021 can be determined and change according to actual need.

As shown in FIG. 1, in one embodiment, the modular device 100 may include two connection modules 102, one of which includes two building elements 1021, and the other of which includes three building elements 1021.

In one embodiment, the main control module 101 includes a number of second type connectors. Each building element 1021 can be polyhedral and includes one first type connector and L second type connectors on different side surfaces of the building element 1021, where L is a natural number greater than or equal to 1, and less than the number of the side surfaces of each building element 1021. Each building element 1021 can be detachably connected to the main control module 101 by engagement of the first type connector of the building element 1021 with one second type connector of the main control module 101. Two building elements 1021 can be detachably connected to each other by engagement of the first type connector of one building element 1021 with one second type connector of the other building element 1021.

In one embodiment, the first type connector can be a male connector, and the second type connectors can be female connectors that can be detachably connected to the male connector by magnetic attractive force. Each building element 1021 can be a tetrahedron, a cube, or an octahedron. Serial peripheral interface (SPI), I²C, universal asynchronous reception and transmission (UART) and other serial buses may be used for data communication among various parts of the modular device 100, for example, between the main control module 101 and one building element 1021, and among various building elements 1021. For example, the main control module can communicate with the building elements 1021 through UART.

Figure 2:
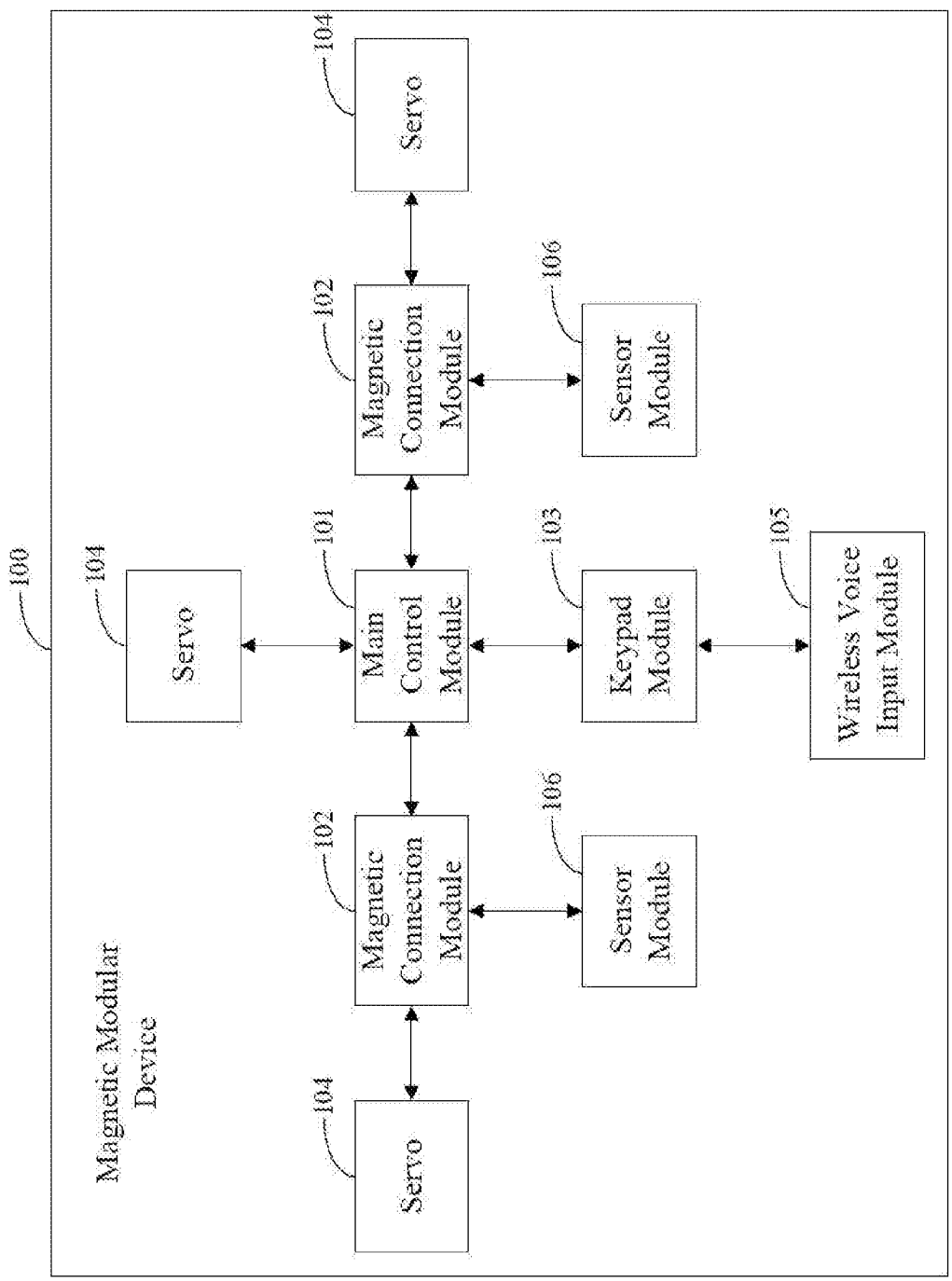
FIG. 2 is a schematic block diagram of a modular device according to one embodiment.

Referring to FIG. 2, in one embodiment, the modular device 100 further includes at least one of a keypad module 103, at least one servo 104, a wireless voice input module 105, and at least one sensor module 106. The keypad module 103 includes a first type connector and a number of second type connectors. Each of the at least one servo 104 includes a first type connector. The wireless voice input module 105 includes a first type connector. Each of the at least one sensor module 106 includes a first type connector.

One first type connector of the keypad module 103 can be connected to one second type connector of the main control module 101. One first type connector of the at least one servo 104 can be connected to one second type connector of the main control module 101 or one building element 1021. One first type connector of the wireless voice input module 105 can be connected to one second type connector of the main control module 101 or the keypad module 103. One first type connector of the at least one sensor module 106 can be connected to one second type connector of the main control module 101 or one building element 1021.

The number, type and configuration of servos and sensors can be determined according to actual needs. Each servo can be directly connected to the main control module through the engagement of one first type connector with one second type connector. Alternatively, each servo can be indirectly connected to the main control module through one building element that is connected to the main control module through the engagement of one first type connector with one second type connector. The wireless voice input module can be directly connected to the main control module through the engagement of one first type connector with one second type connector. Alternatively, the wireless voice input module can be indirectly connected to the main control module through the keypad module that is connected to the main control module through the engagement of one first type connector with one second type connector. Each sensor can be indirectly connected to the main control module through one building element that is connected to the main control module through the engagement of one first type connector with one second type connector. The number L of the second type connectors of each building element is greater than or equal to the total number of the main control module and, the keypad module, the servos, and other devices required to be connected to the main control module. Data communication can be achieved among the main control module and the servos, and among building elements and the servos through the UART serial buses. The main control module can communicate with the keypad module through $I^2C$ serial buses. Data communication can be achieved through the UART serial buses between the wireless voice input module and the keypad module, between the wireless voice input module and the main control module, among sensors and the building elements, and among the sensors and the main control module.

In one embodiment as shown in FIG. 2, the number of the servos 104 is three, and the number of the sensor modules 106 are two. One servo 104 is directly connected to the main control module 101 by engagement of one first type connector with one second type connector. The other two servos 104 are indirectly connected to the main control module 101 through building elements 1021. The wireless voice input module 105 is indirectly connected to the main control module 101 through the keypad module 103. The two sensor modules 106 are both indirectly connected to the main control module 101 through building elements 1021.

Figure 3:
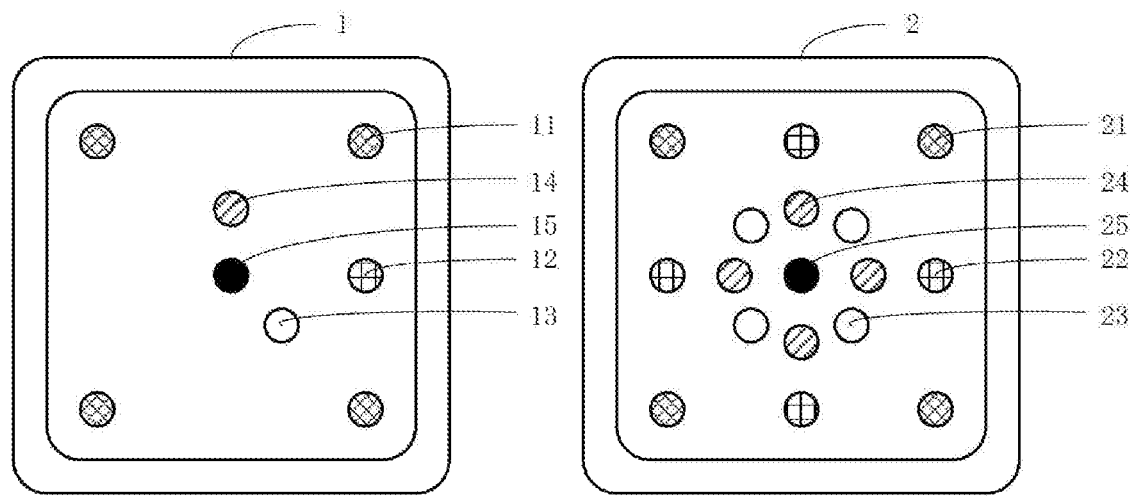
FIG. 3 is a schematic planar view showing the mating surfaces of one first type connector and on second type connector according to one embodiment.

Referring to FIG. 3, in one embodiment, each first type connector 1 includes M first magnets 11, a first ground terminal 12, a first detection terminal 13, a first power terminal 14, and a first signal terminal 15. Each second type connector 2 includes M second magnets 21 that are magnetically attractable to the first magnets 11, N second ground terminals 22, O second detection terminals 23, P second power terminals 24, and a second signal terminal 25, where M, N, O, and P are natural numbers and at least one of them is greater than 1. When one first type connector 1 is mechanically connected to one second type connector 2 by the engagement of the first magnets 11 with the second magnets 21, the first ground terminal 12, the first detection terminal 13, the first power terminal 14 and the first signal terminal 15 of the first type connector 1 respectively come into contact with one of the second ground terminals 22, one of the second detection terminals 23, one of the second power terminals 24, and the second signal terminal 25 of the second type connector 2.

The numbers M, N, O, and P can change according to actual needs. The arrangement of the first magnets 11, the second magnets 21, and the various terminals can change according to actual needs, on the condition that the first magnets 11 can be respectively attracted to the second magnets 21, and that the first ground terminal 12, the first detection terminal 13, the first power terminal 14 and the first signal terminal 15 respectively come into contact with one of the second ground terminals 22, one of the second detection terminals 23, one of the second power terminals 24, and the second signal terminal 25.

In one embodiment, each of the main control module, the keypad module, the servos, the wireless voice input module, and the sensor modules may have one first type connector, and L second type connectors. These components can be connected to one another by the engagement of the first type connectors and the second type connectors.

Referring to FIG. 3, in one embodiment, the numbers M, N, O, and P are all four. The four first magnets 11 are evenly arranged adjacent to four corners of the first type connector 1. The first ground terminal 12 is arranged between two adjacent ones of the four first magnets 11. The first signal terminal 15 is arranged between two of the four first magnets 11, which are located on a diagonal of an imaginary rectangle formed by the four first magnets 11. The first detection terminal 13 is arranged between the signal terminal 15 and one of the first magnets 11. The power terminal 14 is arranged within a first triangular area defined by the two of the first magnets 11 and the first signal terminal 15, and the first signal terminal 15 is located at a center of a square defined by the four first magnets 11.

The four second magnets 21 are evenly arranged adjacent to four corners of each second type connector 2. Each second ground terminal 22 is arranged between two adjacent ones of the second magnets 21. The second signal terminal 25 is arranged between two of the four second magnets 21, which are located on a diagonal of an imaginary rectangle formed by the four second magnets 21. Each second detection terminals 23 is arranged between the second signal terminal 25 and one of the second magnets 21. Each second power terminal 24 is arranged within one second triangular area defined by the second signal terminal 25 and two adjacent ones of the four second magnets 21. Rectangles defined by the four second magnets 21, by the four second ground terminals 22, by the four second detection terminals 23, and by the four power terminals 24 share a same center and the second signal terminal 25 is located at the center of the four rectangles.

As shown in FIG. 3, areas with the same filling represent the same component. The magnets and terminals described above are schematically to have circular cross sections. However, the size and the shape of the magnets and terminals described above can change according to actual needs.

Figure 4:
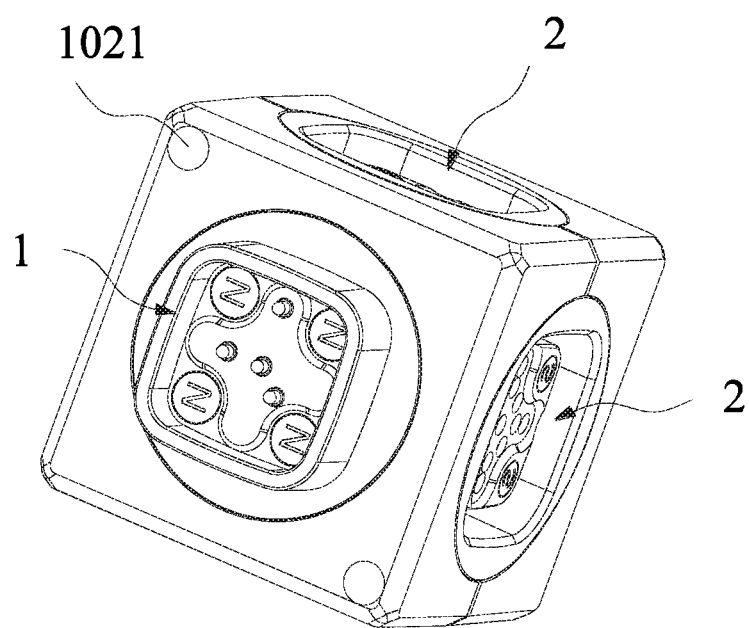
FIG. 4 is a schematic isometric view of a building element according to one embodiment.

Referring to FIG. 4, in one embodiment, the building element 1021 is a cube. The number L equals to five, and the numbers M, N, O, and P all equal to four. One first type connector and five second type connectors are respectively disposed on the six side surfaces of the building element 1021.

Figure 5:
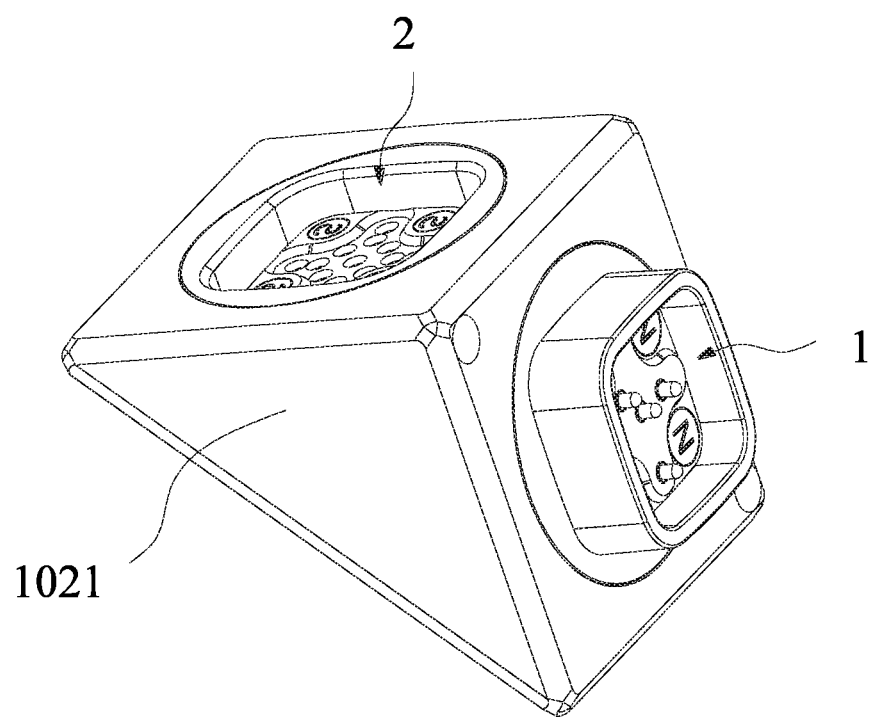
FIG. 5 is a schematic isometric view of a building element according to one embodiment.

Referring to FIG. 5, in one embodiment, the building element 1021 may be a tetrahedron. The number L equals to three, and the numbers M, N, O, and P all equal to four. One first type connector and five second type connectors are respectively disposed on the four side surfaces of the building element 1021.

In one embodiment, during the construction process of the modular device, the main control module 101 is configured to perform the following actions. The main control module 101 is configured to enable each second signal terminal 25 of each second type connector 2 of the main control module 101. The main control module 101 is configured to set an ID number to the building element 1021 that is connected to one second type connector 2 of the main control module 101. When multiple components are connected to the main control module 101, the main control module 101 is configured to set an ID number to each of these components. For example, the main control module 101 may be configured to set an ID number to each of the keypad module 103, a number of building elements 1021, a number of servos 104, the wireless voice input module 105, and a number of sensor modules 106, in the order in which these components are connected to the main control module 101. The main control module 101 is configured to obtain connection state of each of these components, which includes successful connection of one first type connector 1 with one second type connector 2, failed connection of one first type connector 1 with one second type connector 2, and the orientation of one second detection terminal of one second type connector, which is in contact with the detection terminal of one first type connector 1.

When the modular device has been constructed and energized, the main control module 101 is configured to detect voltage of the first detection terminals 13 of the first type connectors 1 connected to the second type connectors 2 of the main control module 101, and voltage of the second detection terminals 23 of the second type connectors 2 of the main control module 101, according to a voltage detection instruction sent by the keypad module 103.

The main control module 101 is configured to determine the connection state of each of the first type connectors 1 and the second type connectors 2 of the main control module 101, according to the detected voltage of the first detection terminals 13 of the first type connectors 1 connected to the second type connectors 2 of the main control module 101, and voltage of the second detection terminals 23 of the second type connectors 2 of the main control module 101. The connection state includes successful connection of one first type connector 1 with one second type connector 2, failed connection of one first type connector 1 with one second type connector 2, and the orientation of one second detection terminal of one second type connector, which is in contact with the detection terminal of one first type connector 1.

The main control module 101 is configured to obtain the device information of the keypad module 103, a number of building elements 1021, a number of servos 104, the wireless voice input module 105, and a number of sensor modules 106, according to an information acquiring instruction sent by the keypad module 103 and the connection state. The device information includes device type, ID number, orientation and connection surface.

The main control module 101 is configured to send the device information to a client through the wireless voice input module 105, so that the client can displays a building model and the orientation according to the device information.

The main control module 101 is configured to obtain the device information of the keypad module 103, a number of building elements 1021, a number of servos 104, the wireless voice input module 105, and a number of sensor modules 106, according to an information acquiring instruction sent by the keypad module 103 and the connection state. The device information includes device type, ID number, orientation and connection surface. In one embodiment when the main control module 101 has limited computing power, the keypad module 103 may be used to receive and process the read/write commands sent by the main control module 101, enable/disable the signal input terminals and signal output terminals of the second type connectors of the main control module 101, display the connection state, and receive control commands input by a user and send them to the main control module 101. It should be noted that when the main control module 101 has sufficient computing power, the above-mentioned actions performed by the keypad module 103 can be performed solely by the main control module 101.

The wireless voice input module 105 is used to collect and recognize voice commands, send the voice recognition result to the client, and directly send the voice recognition result, directly or through the keypad module 103, to the main control module 101.

The main control module 101 is further configured to control slave building elements to perform corresponding operations according to control instructions and the voice recognition result.

The wireless voice input module 105 is also used to send the connection state and operation result to the client.

In one embodiment as shown in FIG. 3, the four second detection terminals 23 of one second type connector 2 may be set to have an orientation of 0°, 90°, 180° and 270°, each of which corresponds to one orientation of the second type connector 2 with respect to one first type connector 1 connected to the second type connector 2. By detecting which of the four second detection terminals 23 is in contact with the first detection terminal 13, the orientation of the second type connector 2 with respect to one first type connector 1 connected to the second type connector 2 can be determined.

In one embodiment, the main control module 101 may include a processor. The processor may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

The sensor module 106 can be any type of sensor according to actual needs, such as distance sensor, temperature sensor, humidity sensor, smoke sensor, light sensor, infrared sensor, etc. The keypad module 103 may be a touch display with physical or touch keys. The wireless voice input module 105 may be any type of voice input device that has wireless communication abilities such as Bluetooth, WiFi, and ZigBee, as well as voice collection, recognition, and playback functions. The client may be a mobile phone, a tablet computer, a cloud server, a smart band, a notebook computer, a personal digital assistant and the like. The modular device may be a self-reconfiguring modular robot.

In the embodiment, the main control module, the keypad module, the servos, the wireless voice input module and the sensor modules can be connected to one another by the first type connectors and the second type connectors, which can improve the construction efficiency of the modular device.

Figure 6:
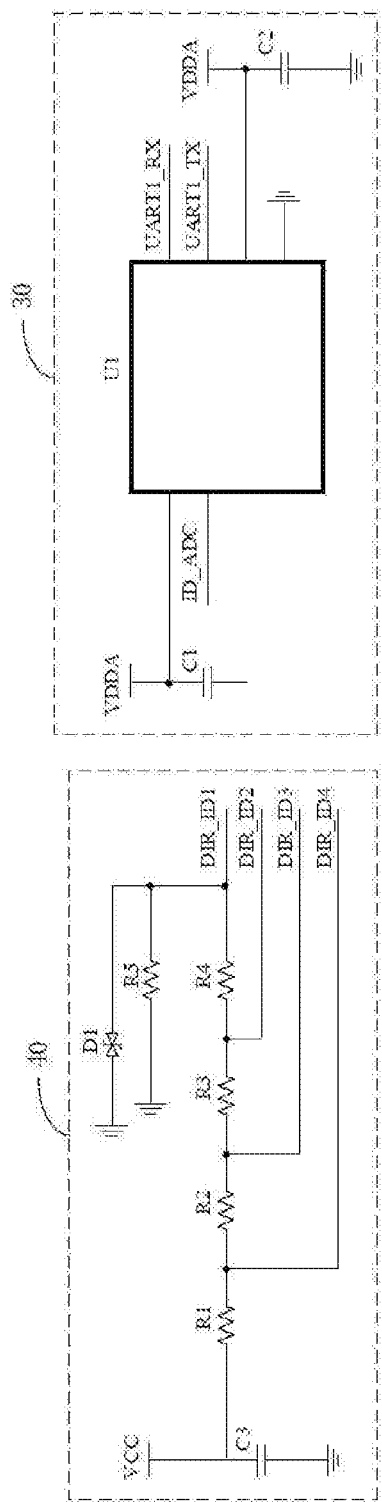
FIG. 6 is a schematic diagram of a first detection circuit and a second detection circuit according to one embodiment.

Referring to FIG. 6, in one embodiment, the modular device 100 further includes a first detection circuit 30 arranged within each first type connector 1, and a second detection circuit 40 arranged within each second type connector 2.

In one embodiment, the first detection circuit 30 includes a first control module U1 that includes a first power pin electrically connected to a power supply VDDA, an orientation detection pin ID_ADC electrically connected to the first detection terminal 13 of the first type connector 1, a signal input pin UART1_RX and a signal output pin UART1_TX that are connected to the first signal terminal 15 of the first type connector 1, a first ground pin that is grounded, and L voltage detection pins.

The second detection circuit 40 includes Q first voltage dividing resistors connected successively. A first of the first voltage dividing resistors is connected to the power supply VCC, and a last of the first voltage dividing resistors is grounded. O detection orientation terminals are respectively connected to O nodes between O pairs of adjacent ones of the first voltage dividing resistors, and the O orientation detection terminals are respectively connected to the O second detection terminals of one corresponding second type connector, where Q is greater than O.

In one embodiment as shown in FIG. 6, O equals to four, and Q equals to five. The second detection circuit 40 then includes five first voltage dividing resistors R1 through R5 connected to one another successively. A first of the first voltage dividing resistor R1 is connected to the power supply, and a last voltage dividing resistor R5 is grounded. Four detection terminals DIR_ID1, DIR_ID2, DIR_ID3 and DIR_ID4 are respectively connected to four nodes between four pairs of adjacent first voltage dividing resistors (i.e., resistors R1 and R2, R2 and R3, R3 and R4, and R4 and R5). The four detection terminals are respectively connected to the four second detection terminals of the second type connector 2.

When one second type connector 2 of the main control module 101 is connected to the first type connector 1 of one building element 1021, the main control module 101 is used to obtain detection voltage values from the first detection circuit 30 of the first type connector 1 and the second detection circuit 40 of the second type connector 2 of the main control module 101. The main control module 101 used to determine an orientation of the building element 1021 with respect to the main control module 101 based on the detection voltage values. The working principles of the first detection circuit 30 and the second detection circuit 40 are as follows: when one first type connector 1 is engaged with one second type connector 2, the first control module U1 determines the orientation of one of the second detection terminals 23 of the second type connector 2, which is in contact with the first detection terminal 13 of the first type connector 1, according to an voltage value of the orientation detection pin ID_ADC of the first control module U1. The first control module U1 further sets the orientation detection pin ID_ADC to be in an output mode and controls the orientation detection pin ID_ADC to output low level voltage.

It should be noted that the numbers O and Q can change according to actual needs on the condition that Q is greater than O and that O orientation detection terminals are respectively connected to O nodes between O pairs of adjacent ones of the first voltage dividing resistors. Since the O orientation detection terminals are respectively connected to the O second detection terminals of one corresponding second type connector, when one first type connector 1 is engaged with one second type connector 2, causing one second detection terminal 23 of the second type connector 2 to be in contact with the first detection terminal 13 of the first type connector 1, the voltage of the detection pin ID_ADC of the first control module U1 can be detected. Since different detection terminals of the second type connector are connected to different orientation detection terminals of the second detection circuit, and the orientation detection terminals are respectively connected to O nodes between O pairs of adjacent ones of the first voltage dividing resistors, the voltage of the orientation detection pin of the control module U1 is different when different second detection terminal 23 is in contact with the first detection terminal 13. Therefore, according to the voltage detected by the orientation detection pin of the control module U1, it can determine which second detection terminal 23 of the second type connector 2 is in contact with the first detection terminal 13 of the first type connector 1. As a result, it can determine the orientation of the second detection terminal 23 of the second type connector 2 that is in contact with the first detection terminal 13 of the first type connector 1.

In one embodiment, the first control module U1 may include a processor. The processor may be a central processing unit (2), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

Referring again to FIG. 6, in one embodiment, the first detection circuit 30 further includes at least one first bypass capacitor that is connected between the first power pin VDDA and the first ground pin of the first control module U1. The second detection circuit further includes at least one second bypass capacitor that is connected between the first voltage dividing resistor R1 and ground, and a voltage stabilizing diode D1 that is connected between the last voltage dividing resistor R5 and ground.

The number and capacitance of the first bypass capacitors and the second bypass capacitors can be determined according to actual needs. For example, as shown in FIG. 6, the first detection circuit 30 may include two first bypass capacitors C1 and C2. The first bypass capacitor C1 is connected between the first power pin VDDA of the first control module U1 and ground, and the second bypass capacitor C2 is connected to the power supply of the control module U1. The second detection circuit 40 may include one second bypass capacitors C3.

Figure 7:
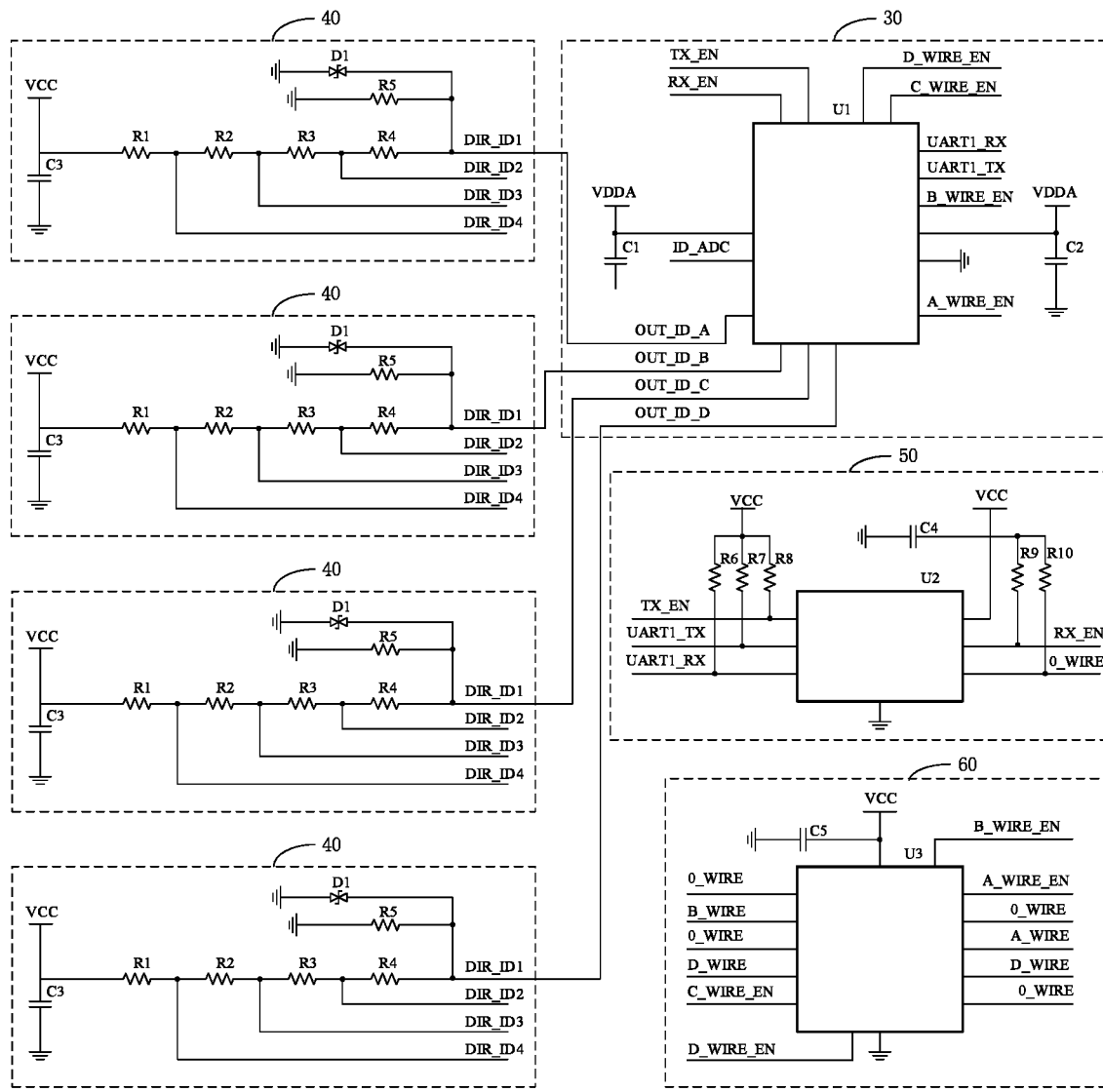
FIG. 7 is a schematic circuit diagram of a building element according to an embodiment.

Referring to FIG. 7, in one embodiment, the first control module U1 further includes L voltage detection pins, and one of the O orientation detection terminals is connected to one of the L voltage detection pins of the first control module U1. The building element 1021 includes one first detection circuit 30 and L second detection circuits 40.

In the embodiment as shown in FIG. 7, L is equal to four, and the first control module U1 includes four voltage detection pins OUT_ID_A, OUT_ID_B, OUT_ID_C, and OUT One of the four detection terminals DIR_ID1, DIR_ID2, DIR_ID3 and DIR_ID4 is connected to one of the voltage detection pins OUT_ID_A, OUT_ID_B, OUT_ID_C, and OUT_ID_D. For example, the four detection terminals DIR_ID1, DIR_ID2, DIR_ID3 and DIR_ID4 are respectively connected to the detection terminals DIR_ID1 of four second detection circuits 40 of the building element 1021.

In one embodiment, when the first control module U1 detects an input low level voltage on any of the four voltage detection pins OUT_ID_A, OUT_ID_B, OUT_ID_C, and OUT_ID_D, the first control module U1 determines that the second type connector 2 having the low-voltage input detection pin is connected to the first type connector 1 of one building element 104. When the first control module U1 detects an input high level voltage on any of the four voltage detection pins OUT_ID_A, OUT_ID_B, OUT_ID_C, and OUT_ID_D, the first control module U1 determines that the second type connector 2 having the high-voltage input detection pin is not connected to the first type connector 1 of one building element 104.

After the control module of a device connected to one building element has determined the orientation of one detection terminal of the second type connector connected to the detection terminal of the first type connector, the control module sets its orientation detection pin to be in an output mode and controls the orientation detection pin to output low level voltage. The control module of the building element can then detect an input low level voltage on one of its voltage detection pins, and determine that one second type connector of the building element has been connected to one first type connector of a device.

Referring to FIG. 7, in one embodiment, the building element 1021 further includes a gating circuit 50 and an electronic switching circuit 60. The gating circuit 50 includes a gating module U2 that includes a ground pin that is grounded, a power pin that is connected to the power supply VCC, a signal input pin UART1_RX that is connected to the signal input pin UART1_RX of the first control module U1, a signal output pin UART1_TX that is connected to the signal output pin UART1_TX of the first control module U1, a signal input controlled pin RX_EN, a signal output controlled pin TX_EN, and a number of gating pins 0_WIER.

The electronic switching circuit 60 an electronic switching module U3 that includes a ground pin that is grounded, a power pin that is connected to the power supply VCC, L signal pins that are respectively connected to signal terminals of the second type connectors, L gating pins that are connected to the gating pins 0_WIER of the gating module U2, and L gating signal pins.

The first control module U1 further includes a signal input control pin RX_EN connected to the signal input controlled pin RX_EN of the gating module U2, a signal output control pin TX_EN connected to the signal output controlled pin TX_EN of the gating module U2, and L gating signal pins that are respectively connected to the L gating signal pins of the electronic switching circuit U3.

In the embodiment as shown in FIG. 7, the number L is equal to four, and the electronic switching module U3 includes four gating pins 0_WIER and four signal pins A_WIRE, B_WIRE, C_WIRE, and D_WIRE. The first control module U1 includes four gating signal pins A_WIRE_EN, B_WIRE_EN, C_WIRE_EN, and D_WIRE_EN.

In one embodiment, the first control module U1 is configured to: enable/disable the signal input pin UART1_RX of the gating module U2 through the signal input control pin RX_EN, enable/disable the signal output pin UART1_TX of the gating module through the signal output control pin TX_EN, enable/disable the four gating signal pins A_WIRE, B_WIRE, C_WIRE, and D_WIRE of the electronic switching circuit U3 through the four gating signal pins A_WIRE_EN, B_WIRE_EN, C_WIRE_EN, and D_WIRE_EN of the first control module U1, and control the gating module U2 to select an output signal from one of the signal pins of one second type connector through the gating pins of the electronic switching module U3.

The gating module can be implemented by any suitable chip, circuit or device with the above-mentioned gating function, and the electronic switch module be any chip, circuit or device including an electronic switching transistor and having the above-mentioned switching function.

Referring to FIG. 7, in one embodiment, the gating circuit 50 further includes at least five second voltage dividing resistors and at least one third bypass capacitor. The signal input pin UART1_RX, the signal output pin UART1_TX, the signal input controlled pin RX_EN, the signal output controlled pin TX_EN, and the gating pin 0_WIER of the gating module U2 are respectively connected to the power supply VCC through at least one of the at least five second voltage dividing resistors. The at least one third bypass capacitor is connected between the power pin of the gating module U2 and ground. The electronic switching circuit further comprises at least one fourth bypass capacitor that is connected between the power pin of the electronic switching module and ground.

It should be noted that the number and capacitance of the second voltage dividing resistors, the third bypass capacitor, and the fourth bypass capacitor can change according to actual needs.

In the embodiment as shown in FIG. 7, the gating circuit 50 includes five second voltage dividing resistors R6 through R10 and one third bypass capacitor C4. The signal input pin UART1_RX, the signal output pin UART1_TX, the signal input controlled pin RX_EN, the signal output controlled pin TX_EN, and the gating pin 0_WIER of the gating module U2 are respectively connected to the power supply VCC through the five second voltage dividing resistors R6 through R10. The electronic switching circuit 60 includes one fourth bypass capacitor C5.

Figure 8:
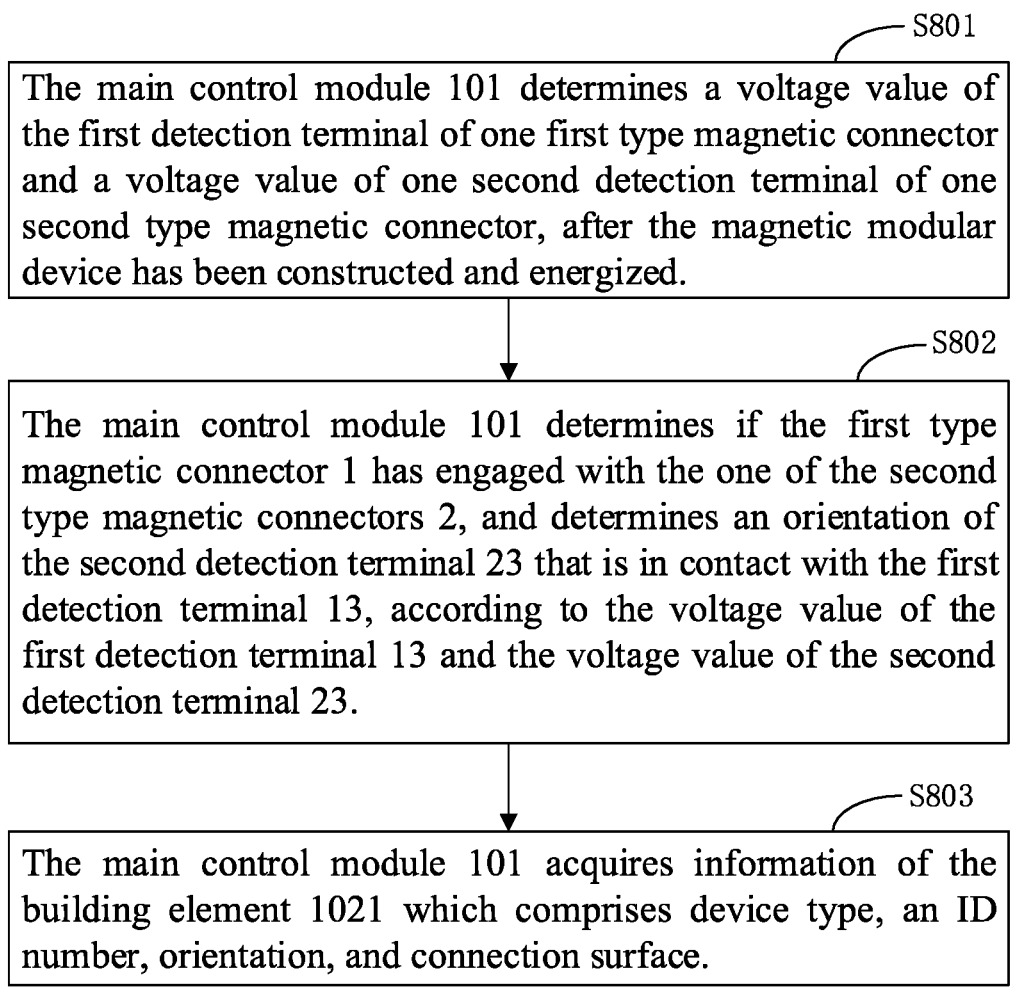
FIG. 8 is a flowchart of a method for controlling the modular device according to one embodiment.

Referring to FIG. 8, in one embodiment, a method for controlling the modular device 100 includes the following steps.

Step S801: The main control module 101 determines a voltage value of the first detection terminal of one first type connector and a voltage value of one second detection terminal of one second type connector, after the modular device has been constructed and energized.

In one embodiment, the modular device can be constructed manually or by tools. The modular device can be powered by its battery or obtain power from a power source by connecting with an outlet located at a fixed position (e.g. wall). The modular device may further include at least one of power supply components such as a battery, a power interface, and a power plug, and conventional components such as circuit boards, housings, and supports, which are not described in detail here.

In one embodiment, the step S801 includes: when the modular device has been constructed and energized, the main control module 101 is configured to detect voltage of the first detection terminals 13 of the first type connectors 1 connected to the second type connectors 2 of the main control module 101, and voltage of the second detection terminals 23 of the second type connectors 2 of the main control module 101, according to a voltage detection instruction sent by the keypad module 103.

In one embodiment, a user can input the voltage detection instruction through buttons on the keypad module, or send a voice command to the wireless voice input module to trigger the main controller to detect voltage of the first detection terminals 13 of the first type connectors. The wireless voice input module then recognizes the voice command as a voltage detection instruction, and sends it to the main control module through the keypad module. Optionally, the user can also establish a wireless communication connection with the wireless voice input module through the client, and then send the voltage detection instruction to the wireless voice input module through the client, and then send it to the main control module through the keypad module.

The voltage of the first detection terminals 13 of the first type connectors 1 connected to the second type connectors 2 of the main control module 101 is the voltage output by the orientation detection pin of the first control module U1, and the voltage of the second detection terminals 23 of the second type connectors 2 of the main control module 101 is the voltage input by the orientation detection pin of the first control module U1.

Step S802: The main control module 101 determines if the first type connector 1 has engaged with the one of the second type connectors 2, and determines an orientation of the second detection terminal 23 that is in contact with the first detection terminal 13 when the first type connector 1 has engaged with the one of the second type connectors 2, according to the voltage value of the first detection terminal 13 and the voltage value of the second detection terminal 23.

In one embodiment, when the first type connector 1 is engaged with one of the second type connectors 2, the first control module 101 is configured to determine an orientation of one of the second detection terminals 23 of the one of the second type connectors 2, which is connected to the first detection terminal 13 of the first type connector 1, according to an voltage value of the orientation detection pin of the first control module 101. The first control module U1 further sets the orientation detection to output low level voltage. Therefore, when the voltage of the first detection terminal of the first type connector is at low level, it is determined that the second type connector 2 and the first type connector 1 are engaged with each other; otherwise, it is determined that the second type connector and the first type connector are not engaged with each other.

Step S803: The main control module 101 acquires information of the building element 1021 which comprises device type, an ID number, orientation, and connection surface.

In one embodiment, the step S803 further includes: when multiple components are connected to the main control module 101, the main control module 101 is configured to obtain the device information of the keypad module 103, a number of building elements 1021, a number of servos 104, the wireless voice input module 105, and a number of sensor modules 106, according to an information acquiring instruction sent by the keypad module 103 and the connection state. The device information includes device type, ID number, orientation and connection surface.

The device information acquiring instruction can be sent to the main control module in a way the same as the way the detection instruction is sent to the main control module, and details are not described herein.

In one embodiment, a unique code or character string can be set for each device type. The ID number of each building element, each servo, and each sensor module can be a unique ID for distinction of the components connected to the main control module. The connection surface refers to the surface of one building element, which includes one first/second type connector that is connected to a second/first type connector. Since the building element is a polyhedron and the first type connector and the second type connectors are provided on different surfaces, it is necessary to obtain the information of the connection surface provided with the first/second type connector that is connected to another device such that the configuration and shape of the entire modular device can be determined.

In on embodiment, the method may further include, after step S803, that the main control module 101 is configured to send the device information to a client through the wireless voice input module 105, so that the client can displays a building model and the orientation according to the device information.

In one embodiment, after receiving the device information, the client analyzes and processes the device information, and obtains and displays the building model of the modular device and the orientation of each first type connector connected to one second type connector. The building model is to display the shape and construction of the modular device in an isometric view, a planar view or a video. After one first type connector and one second type connector are engaged with each other, the two connection surfaces with the first type connector and the second type connector are blocked. Therefore, the orientation needs to be displayed in a see-through drawing or with an orientation mark-up.

In one embodiment, the method further includes: the main control module 101 receives a matching result between a preset model and the building model, and when the matching result indicates that the preset model and the building model do not match, the main control module 101 will output an error prompt, the preset model and instructions for constructing the preset model to be displayed on the keypad module, or will output an audible error prompt and instructions for constructing the preset model through a speaker.

In one embodiment, the method further includes, before step S801, that the main control module 101 enables each second signal terminal 25 of each second type connector 2 of the main control module 101. The main control module 101 then sets an ID number to the building element 1021 that is connected to one second type connector 2 of the main control module 101. When multiple components are connected to the main control module 101, the main control module 101 will set an ID number to each of these components.

The installation positions of the second type connectors of the main control module can be determined according to the structure and function requirements of a specific application scenario. For example, each second type connector can be assigned with a number and the signal terminal of each second type connectors of the main control module can be enabled in sequence.

In one embodiment, the method further includes, after each second signal terminal 25 of each second type connector 2 of the main control module 101 has been enabled, that the main control module 101 sets an ID number to each of the keypad module 103, a number of building elements 1021, a number of servos 104, the wireless voice input module 105, and a number of sensor modules 106, in the order in which these components are connected to the main control module 101.

The ID numbers of the keypad module, the building elements, the servos, the wireless voice input module and the sensor modules can be set by the main control module, or can be stored in the keypad module, the building elements, the servos, the wireless voice input module and the sensor modules.

With the method as described above, after the modular device has been constructed, the device information can be obtained and sent to a client. The client can then display the building model and orientation of the modular device according to the device information, so that it can be determined whether the modular device is correctly constructed according to the building model and the orientation.

In one embodiment, a robot includes the modular device as described above, a storage electrically connected to the main control module 101 of the modular device, one or more computer programs stored in the storage and executable by the main control module 101. When the main control module 101 executes the computer programs stored in the storage, the steps of the method as described above are implemented.

In one embodiment, the storage may be an internal storage unit, such as a hard disk or a memory. The storage may also be an external storage device, such as a plug-in hard disk, a smart memory card (SMC), and a secure digital (SD) card, or any suitable flash cards. Furthermore, the storage may also include both an internal storage unit and an external storage device. The storage is used to store computer programs, other programs, and data required by the robot. The storage can also be used to temporarily store data that have been output or is about to be output.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A modular device comprising:
a polyhedral building element comprising a first type connector and a plurality of second type connectors, the first type connector and the second type connectors disposed on side surfaces of the building element, respectively; and
a main control module comprising a plurality of second type connectors;
wherein one of the second type connectors of the main control module is configured to magnetically connect with the first type connector of the building element so as to detachably connect the building element to the main control module;
wherein the first type connector comprises a first detection circuit, and each of the second type connectors of the building element and the second type connectors of the main control module comprises a second detection circuit, when one of the second type connectors of the main control module is connected to the first type connector of the building element, the main control module is configured to obtain detection voltage values from the first detection circuit and the second detection circuit of the one of the second type connectors of the main control module, and the main control module is configured to determine an orientation of the building element with respect to the main control module based on the detection voltage values.

2. The modular device according to claim 1, further comprising at least one of a keypad module, a servo, a wireless voice input module, and a sensor module, wherein the keypad module comprises a first type connector that is configured to magnetically connect with one of the second type connectors of the main control module, and a plurality of second type connectors, each of the servo and the sensor module comprises a first type connector that is configured to magnetically connect with one of the second type connectors of the main control module or the building element, and the wireless voice input module comprises a first type connector that is configured to magnetically connect with one of the second type connectors of the main control module or the keypad module.

3. The modular device according to claim 1, wherein the first type connector comprises M first magnets, a first ground terminal, a first detection terminal, a first power terminal, and a first signal terminal, each of the second type connectors comprises M second magnets that are magnetically attractable to the first magnets, N second ground terminals, O second detection terminals, P second power terminals, and a second signal terminal, where M, N, O, and P are natural numbers and at least one of them is greater than 1, when the first type connector is mechanically connected to one of the second type connectors by the first magnets and the second magnets thereof, the first ground terminal, the first detection terminal, the first power terminal and the first signal terminal of the first type connector respectively come into contact with one of the second ground terminals, one of the second detection terminals, one of the second power terminals, and the second signal terminal of the second type connector.

4. The modular device according to claim 3, wherein M, N, O and P are all equal to four, the four first magnets are evenly arranged adjacent to four corners of the first type connector, the first ground terminal is arranged between two adjacent ones of the four first magnets, the first signal terminal is arranged between two of the four first magnets that are located on a diagonal of an imaginary rectangle formed by the four first magnets, the first detection terminal is arranged between the first signal terminal and one of the first magnets, the first power terminal is arranged within a first triangular area defined by the two of the first magnets and the first signal terminal, and the first signal terminal is located at a center of a square defined by the four first magnets;
the four second magnets are evenly arranged adjacent to four corners of each second type connector, each of the four second ground terminals is arranged between two adjacent ones of the second magnets, the second signal terminal is arranged between two of the four second magnets, which are located on a diagonal of an imaginary rectangle formed by the four second magnets, each of the four second detection terminals is arranged between the second signal terminal and one of the second magnets, each of the four second power terminals is arranged within one second triangular area defined by the second signal terminal and two adjacent ones of the four second magnets, rectangles defined by the four second magnets, by the four second ground terminals, by the four second detection terminals, and by the four power terminals share a same center, and the second signal terminal is located at the center of the four rectangles.

5. The modular device according to claim 3, wherein the first detection circuit comprises a first control module that comprises a first power pin electrically connected to a power supply, an orientation detection pin electrically connected to the first detection terminal of the first type connector, a signal input pin and a signal output pin that are connected to the first signal terminal of the first type connector, and a first ground pin that is grounded, and the first control module further comprises L voltage detection pins;

the second detection circuit comprises Q first voltage dividing resistors connected to one another successively, a first of the first voltage dividing resistors is connected to the power supply, and a last of the first voltage dividing resistors is grounded, O orientation detection terminals are respectively connected to O nodes between O pairs of adjacent ones of the first voltage dividing resistors, the O orientation detection terminals are respectively connected to the O second detection terminals of one corresponding second type connector, one of the O orientation detection terminals is connected to one of the L voltage detection pins of the first control module, and Q is greater than O;

when the first type connector is engaged with one of the second type connectors, the first control module is configured to determine an orientation of one of the second detection terminals of the one of the second type connectors, which is connected to the first detection terminal of the first type connector, according to an voltage value of the orientation detection pin of the first control module.

6. The modular device according to claim 5, wherein the first detection circuit further comprises at least one first bypass capacitor that is connected between the first power pin and the first ground pin of the first control module, the second detection circuit further comprises at least one second bypass capacitor that is connected between the first of the first voltage dividing resistors and ground, and a voltage stabilizing diode that is connected between the last of the first voltage dividing resistors and ground.

7. The modular device according to claim 5, wherein the building element further comprises an electronic switching circuit and a gating circuit that comprises a gating module, the gating module comprises a ground pin that is grounded, a power pin that is connected to the power supply, a signal input pin that is connected to the signal input pin of the first control module, a signal output pin that is connected to the signal output pin of the first control module, a signal input controlled pin, a signal output controlled pin, and a plurality of gating pins;

the electronic switching circuit comprises an electronic switching module, the electronic switching module comprises a ground pin that is grounded, a power pin that is connected to the power supply, L signal pins that are respectively connected to signal terminals of the second type connectors of the building element, L gating pins that are connected to the gating pins of the gating module, and L gating signal pins;

the first control module further comprises a signal input control pin connected to the signal input controlled pin of the gating module, a signal output control pin connected to the signal output controlled pin of the gating module, and L gating signal pins that are respectively connected to the L gating signal pins of the electronic switching circuit;

the first control module is configured to: enable/disable the signal input pin of the gating module through the signal input control pin, enable/disable the signal output pin of the gating module through the signal output control pin, enable/disable L signal pins of the electronic switching circuit through the L gating signal pins of the first control module, and control the gating module to select an output signal from one of the signal pins of one of the second type connectors through the gating pins of the electronic switching module.

8. The modular device according to claim 7, wherein the gating circuit further comprises at least five second voltage dividing resistors and at least one third bypass capacitor, the signal input pin, the signal output pin, the signal input controlled pin, the signal output controlled pin, and the gating pins of the gating module are respectively connected to the power supply through at least one of the at least five second voltage dividing resistors; the at least one third bypass capacitor is connected between the power pin of the gating module and ground, and the electronic switching circuit further comprises at least one fourth bypass capacitor that is connected between the power pin of the electronic switching module and ground.

9. A method for controlling the modular device of claim 1, the method comprising:

the main control module determining a voltage value of the first detection terminal of the first type connector and a voltage value of one second detection terminal of one of the second type connectors;

the main control module determining if the first type connector has engaged with the one of the second type connectors, and determining an orientation of the second detection terminal that is in contact with the first detection terminal when the first type connector has engaged with the one of the second type connectors, according to the voltage value of the first detection terminal and the voltage value of the second detection terminal; and the main control module acquiring information of the building element which comprises an ID number and orientation of the building element.

10. The method according to claim 9, further comprising, before the main control module determining a voltage value of the first detection terminal of the first type connector and a voltage value of one second detection terminal of one of the second type connectors, setting an ID number to the building element that is connected to the one of the second type connectors of the main control module.

11. A robot comprising a modular device, the modular device comprising:

a polyhedral building element comprising a first type connector and a plurality of second type connectors, the first type connector and the second type connectors disposed on side surfaces of the building element; and a main control module comprising a plurality of second type connectors;

wherein one of the second type connectors of the main control module is configured to magnetically connect with the first type connector of the building element so as to detachably connect the building element to the main control module;

wherein the first type connector comprises a first detection circuit, and each of the second type connectors of the building element and the second type connectors of the main control module comprises a second detection circuit, when one of the second type connectors of the main control module is connected to the first type connector of the building element, the main control module is configured to obtain detection voltage values from the first detection circuit and the second detection circuit of the one of the second type connectors of the main control module, and the main control module is configured to determine an orientation of the building element with respect to the main control module based on the detection voltage values.

\* \* \* \* \*